US007548936B2

(12) United States Patent
Liu et al.

(10) Patent No.: US 7,548,936 B2
(45) Date of Patent: Jun. 16, 2009

(54) SYSTEMS AND METHODS TO PRESENT WEB IMAGE SEARCH RESULTS FOR EFFECTIVE IMAGE BROWSING

(75) Inventors: Hao Liu, ShaTin (HK); Wei-Ying Ma, Beijing (CN); Xing Xie, Beijing (CN); Zhiwei Li, Beijing (CN)

(73) Assignee: Microsoft Corporation, Redmond, WA (US)

( * ) Notice: Subject to any disclaimer, the term of this patent is extended or adjusted under 35 U.S.C. 154(b) by 383 days.

(21) Appl. No.: 11/034,443

(22) Filed: Jan. 12, 2005

(65) Prior Publication Data

US 2006/0155684 A1 Jul. 13, 2006

(51) Int. Cl.
*G06F 7/00* (2006.01)
(52) U.S. Cl. .................................. 707/104.1; 382/173
(58) Field of Classification Search ............... 707/104.1
See application file for complete search history.

(56) References Cited

U.S. PATENT DOCUMENTS

| 5,442,633 | A | 8/1995 | Perkins et al. |
| 5,530,963 | A | 6/1996 | Moore et al. |
| 5,625,877 | A | 4/1997 | Dunn et al. |
| 5,642,294 | A | 6/1997 | Taniguchi et al. |
| 5,659,685 | A | 8/1997 | Williams et al. |
| 5,745,190 | A | 4/1998 | Ioka |
| 5,751,378 | A | 5/1998 | Chen et al. |
| 5,774,593 | A | 6/1998 | Zick et al. |
| 5,801,765 | A | 9/1998 | Gotoh et al. |
| 5,835,163 | A | 11/1998 | Liou et al. |
| 5,884,056 | A | 3/1999 | Steele |
| 5,893,095 | A * | 4/1999 | Jain et al. ...................... 707/6 |
| 5,895,464 | A * | 4/1999 | Bhandari et al. ............... 707/3 |
| 5,900,919 | A | 5/1999 | Chen et al. |
| 5,911,008 | A | 6/1999 | Niikura et al. |
| 5,920,360 | A | 7/1999 | Coleman, Jr. |
| 5,959,697 | A | 9/1999 | Coleman, Jr. |
| 5,983,273 | A | 11/1999 | White et al. |
| 5,990,980 | A | 11/1999 | Golin |
| 5,995,095 | A | 11/1999 | Ratakonda |
| 6,166,735 | A | 12/2000 | Dom et al. |
| 6,462,754 | B1 | 10/2002 | Chakraborty et al. |

(Continued)

FOREIGN PATENT DOCUMENTS

EP          1 168 840          1/2002

(Continued)

OTHER PUBLICATIONS

Mukherjea et al., World Wide Web 2, pp. 115-132, 1999.*

(Continued)

*Primary Examiner*—Cheyne D Ly
(74) *Attorney, Agent, or Firm*—Lee & Hayes, PLLC (57) ABSTRACT

Systems and methods to present web image search results for effective image browsing are described. In one aspect, task-based attention objects for each of multiple images associated with image search results are generated. Thumbnail images from respective ones of the images are created as a function of at least the task-based attention objects. The thumbnail images emphasize image region(s) of greater priority to a user in view of a keyword or expanded keyword associated with the search results.

14 Claims, 9 Drawing Sheets

U.S. PATENT DOCUMENTS

| | | | |
|---|---|---|---|
| 6,466,702 | B1 | 10/2002 | Atkins et al. |
| 6,629,104 | B1 * | 9/2003 | Parulski et al. ............... 707/102 |
| 6,643,665 | B2 | 11/2003 | Kimbell et al. |
| 2002/0166123 | A1 | 11/2002 | Schrader et al. |
| 2003/0152363 | A1 | 8/2003 | Jeannin et al. |
| 2003/0237053 | A1 | 12/2003 | Chen et al. |
| 2004/0040041 | A1 | 2/2004 | Crawford |
| 2004/0078357 | A1 | 4/2004 | LaChapelle et al. |
| 2004/0078382 | A1 | 4/2004 | Mercer et al. |
| 2004/0078383 | A1 | 4/2004 | Mercer et al. |

FOREIGN PATENT DOCUMENTS

| | | |
|---|---|---|
| EP | 1 213 915 | 6/2002 |
| GB | 2 356 080 | 5/2001 |

OTHER PUBLICATIONS

Liu et al., MIR'04, Oct. 15-16, 2004, New York, New York, pp. 84-90.*

Fan et al., Multimedia and Expo, 2003, ICME'03, Proceedings, pp. 53-56, Jul. 2003.*

Hua et al., PCM 2004, LNCS 3332, K. Aizawa, Y. Nakamura, and S. Satoh, (Eds.), 704-711, 2004.*

Shipman III, et al., Hypertext 99 Darmstadt Germany, ACM 1999, pp. 121-130.*

Suh et al., UIST'03, vol. 5, Issue 2, Vancouver, BC, Canada, pp. 95-104.*

Chen et al., Multimedia Systems 9, pp. 353-364, 2003.*

Woodruff et al., Using Thumbnails to Search the Web, CHI 2001, pp. 198-205.*

Ahmad, Subutai; "Visit: A Neural Model of Covert Visual Attention" Advances in Neural Information Processing Systems, v. 4, 1991, pp. 420-427.

Baluja et al.; "Expectation-Based Selective Attention for Visual Monitoring and Control of a Robot Vehicle" Robotics and Autonomous Systems, v. 22 No. 3-4, Dec. 1997, pp. 329-344.

Chen et al.; "A Visual Attention Model for Adapting Images on Small Displays" ACM Multimedia Systems Journal, 2003.

Cherry, Steven M.; "Pesky Home Networks Trouble cable Behemoths" IEEE Spectrum, Apr. 2002, pp. 60-61.

Deng et al.; "Peer Group Filtering and Perceptual Color Image Quantization" Proceedings of IEEE International Symposium on Circuits and Systems, vol. 4, 1999, pp. 21-24.

Gamaz et al.; "Robust scene-change detection in MPEG compressed domain" Electrical & Computer Engineering, 1998, pp. 95-99.

Gu et al.; "Dissolve Detection in MPEG Compressed Video" IEEE, 1997, pp. 1692-1696.

Hargrove, Thomas; "Logo Detection in Digital Video" Math 100, Mar. 6, 2001.

Held, Gilbert; "Focus on Agere System's Orinoco PC Card" International Journal of Network Management, Jan. 2002, pp. 187-193.

http://www.fatalfx.com/nomad/ "NOMAD (No More Advertising)" Feb. 17, 2003, 4 pages.

Divakaran et al.; "Video Summarization Using Descriptors of Motion Activity: A Motion Activity Based Approach to Key-Frame Extraction from Video Shots" Journal of Electronic Imaging, Oct. 2001, vol. 10 n 4, pp. 909-916.

Heng et al.; "Post Shot Boundary Detection Technique: Flashlight Scene Determination" University of Western Australia, 1999, pp. 447-450.

Jha, Uma S.; "Wireless Landscape-Need for Seamless Connectivity" Wireless Personal Communications 2002 pp. 275-283.

Jing et al.; "An Effective Region-Based Image Retrieval Framework" From ACM Multimedia, 2002, 28 pages.

Lelescu et al.; "Real-time Scene Change Detection on Compressed Multimedia Bitstream Based on Statistical Sequential Analysis" IEEE, 2000, pp. 1141-1144.

Li et al.; "Statistical Learning of Multi-View Face Detection" Proceedings of ECCV, 2002, 25 pages.

Lienhart, R. et al.; "On the Detection and Recognition of Television Commercials" University of Mannheim, 17 pages, 1997.

Lu, Lie et al.; "Content Analysis for Audio Classification and Segmentation" IEEE Transactions on Speech and Audio Processing, vol. 10 No. 7, Oct. 2002, pp. 504-516.

Lu, Lie et al.; "Content-Based Audio Segmentation Using Support Vector Machines" IEEE, 2001, pp. 956-959.

Ma et al.; "A User Attention Model for Video Summarization" Proceedings of ICIP, 2002, pp. 1-11.

Milanese R. et al.; "Attentive Mechanisms for Dynamic and Static Scene Analysis" Optical Engineering, v34 No. 8, Aug. 1995, pp. 2428-2434.

Niebur, E. et al.; "Computational Architectures for Attention" The Attentive Brain, Chapter 9, 1998, pp. 163-186.

O'Toole; "An MPEG-1 Shot Boundary Detector Using XIL Colour Histograms" Dublin City University, 1998, pp. 1-7.

Sadlier, David A.; "Automatic TV Advertisement Detection from MPEG Bitstream" Centre for Digital Video Processing/Research Institute for Network & Communication Eng., Dublin City University, 12 pages, 2002.

Sahoo P.K. et al.; "Threshold Selection Using a Minimal Histogram Entropy Difference" Optical Engineering, v36 No. 7, Jul. 1997, pp. 1976-1981.

Sanchez, Juan Maria; "AudiCom: A Video Analysis System for Auditing Commercial Broadcasts" Computer Vision Center Departament d'Informatica Universitat Autonoma de Barcelona, 5 pages, 1999.

Tsotsos J. K. et al.; "Modeling Visual Attention Via Selective Tuning" Artificial Intelligence v78 1995 pp. 507-545.

Wolfe J. M. et al.; "Deploying Visual Attention: The Guided Search Model" AI and the Eye, Chapter 4, 1990, pp. 79-103.

Yeo et al.; "Rapid Scene Analysis on Compressed Video" IEEE, 1995, pp. 533-544.

Yusoff et al.; "Video Shot Cut Detection Using Adaptive Thresholding" University of Surrey, 2000, pp. 1-10.

Zabih, Ramin; "A Feature-Based Algorithm for Detecting and Classifying Scene Breaks" Computer Science Department, Cornell University, 16 pages, 1995.

Zadeh L. A.; "Probability Measures of Fuzzy Events" Journal of Mathematical Analysis and Applications, 23, 1968, pp. 421-427.

M.A. Smith & T. Kanade, "Video Skimming and Characterization through the Combination of Iamge and Language Techniques," Proc. of Computer Vision and Patter Recognition, 1997 IEEE, pp. 775-781.

L. Itti & C. Koch, "Computational Modeling of Visual Attention," Nature Review/Neuroscience, vol. 2, Mar. 2001, pp. 1-11.

L. Itti, C. Koch & E. Niebur, "A Model of Saliency-based Visual Attention for Rapid Scene Analysis," IEEE Trans. on Pattern Analysis and Machine Intelligence, 1998, 5 pages.

L. Itti & C. Koch, "A Comparison of Feature Combination Strategies for Saliency-Based Visual Attention Systems," Proc. of SPIE Human Vision and Electronic Imaging IV (HVEI'99), San Jose, CA, vol. 3644, pp. 473-482, Jan. 1999.

Colin O'Toole et al., "Evaluation of Automatic Shot Boundary Detection on a Large Video Test Suite," School of Computer Applications & School of Electronic Engineering, Dublin City University, Glasnevin, Dublin, Ireland, Challenge of Image Retrieval, Newcastle, 1999, pp. 1-12.

T. Lin, H.J. Zhang, Q.Y. Shi, "Video Scene Extraction by Force Competition," IEEE Intl. Conference on Multimedia and Expo (ICME 001), Waseda University, Tokyo, Japan, Aug. 22-25, 2001, 4 pages.

U.S. Appl. No. 10/179,161, filed Jun. 24, 2002, inventors Jin-Lin Chen & Wei-Ying Ma, entitled "Function-based Object Model for Web Page Display in a Mobile Device,".

U.S. Appl. No. 10/286,348, filed Nov. 1, 2002, inventors Xian-Sheng Hua et al., entitled "Systems and Methods for Automatically Editing a Video,".

U.S. Appl. No. 10/286,053, filed Nov. 1, 2002, inventors Yu-Fei Ma et al., entitled "Systems and Methods for Generating a Comprehensive User Attention Model,".

U.S. Appl. No. 10/285,933, filed Nov. 1, 2002, inventors Yu-Fei Ma et al., entitled "Systems and Methods for Generating a Motion Attention Model,".

Lee, Keansub et al., "Perception-Based Image Transcoding for Universal Multimedia Access," School of Electrical Engineering Korea University, Seoul Korea, 2001 IEEE, pp. 475-478.

Christopoulos, Charilaos, et al., "The JPEG2000 Still Image Coding Systems: An Overview," IEEE Transactions on Consumer Electronics, vol. 46, No. 4, pp. 1103-1127, Nov. 2000.

Chen, Jinlin et al., "Function-based Object Model Towards Website Adaptation," (2001) Proc. of the 10th Inv. WWW Conf. pp. 1-21.

Lu, Xiaoye, et al., "An Integrated Correlation Measure for Semantic Video Segmentation," Department of Comptuer Science, Fudan University, Shanghai, P.R. China, 2002 IEEE, 4 pages.

Ma, Qiang, et al., "A Localness-Filter for Searched Web Pages", 12 pages, 2003.

Athitsos, Vassilis, et al., "Distinguishing Photographs and Graphics on the World Wide Web," Department of Computer Science, University of Chicago, 7 pages, 1997.

Song, Ruihua, et al., "Learning Block Importance Models for Web Pages," Department of Computer Science, University of Toronto, WWW 2004, May 17-22, 2004, New York, 9 pages.

Chen, Yu, et al., "Detecting Web Page Structure for Adaptive Viewing on Small Form Factor Devices," Microsoft Research Asia, WWW 2003, May 20-24, 2003, Budapest Hungary, 9 pages.

Broder, Andrei, "A taxonomy of web search", SIGIR Forum, Fall 2002, vol. 36, No. 2, pp. 3-10.

Rose, Daniel, et al., "Understanding User Goals in Web Search", WWW 2004, May 17-22, 2004, New York, pp. 13-19.

Rodden, Kerry, et al., "How Do People Manage Their Digital Photographs?", CHI 2003, Apr. 5-10, 2003, Ft. Lauderdale, Florida, USA, 8 pages.

Platt, John C., et al., "PhotoTOC: Automatic Clustering for Browsing Personal Photographs," Microsoft Research, Feb. 2002, 21 pages.

Toyama, Kentaro, et al., "Geographic Location Tags on Ditigal Images," Microsoft Research, MM '03, Nov. 2-8, 2003, Berkeley, California, USA, pp. 156-166.

Rodden, Kerry, et al., "Does Organisation by Similarity Assist Image Browsing?", CHI 2001, vol. 3, Issue No. 1, pp. 190-197.

Pirolli, Peter, et al., "The Effect of Information Scent on Searching Information Visualizations of Large Tree Structures," AVI 2000, Palermo, Italy, pp. 161-172.

Chernyak, Dimitri, et al., "Top-Down Guided Eye Movements," IEEE, vol. 31, No. 4, Aug. 2001, pp. 514-522.

Liu, Hao, et al., "Automatic Browsing of Large Pictures on Mobile Devices," MM '03 Nov. 2-8, 2003, Berkeley, California USA, 8 pages.

Wang, Xin-Jing, et al., "Data-Driven Approach for Bridging the Cognitive Gap in Image Retrieval," 2004 IEEE, 4 pages.

Suh, Borgwon, et al., "Automatic Thumbnail Cropping and its Effectiveness," UIST, '03, Vancouver, BC, Canada, vol. 5, Issue 2, pp. 95-104.

Basalaj, Wojciech, "Incremental multidimensional scaling method for database visualization," Computer Laboratory, University of Cambridge, Cambridge UK, 10 pages.

Intraub, Helene, et al., "Boundary Extension for Briefly Glimpsed Photographs: Do Common Perceptual Processes Result in Unexpected Memory Distortions?", Journal of Memory and Language 35, 1996, pp. 118-134.

Borning, Alan, et al., "Constraint-Based Document Layout for the Web," pp. 1-35, 2000.

Buyukkokten, Orkut, et al., "Focused Web Searching with PDAs," Digital Libraries Lab, Stanford University, pp. 1-20, 2000.

Buyukkokten, Orkut, et al., "Power Browser: Efficient Web Browsing for PDAs," Digital Libraries Lab, Stanford University, 8 pages, 2000.

Cai, Deng, et al., "VIPS: a Vision-based Page Segmentation Algorithm," Microsoft Research, Nov. 1, 2003, pp. 1-29.

Gravano, Luis, et al., "Categorizing Web Queries According to Geographical Locality," CIKM '03, Nov. 3-8, 2003, New Orleans, Louisiana, USA, pp. 325-333.

Gupta, Suhit, et al., "DOM-based Content Extraction of HTML Documents," Columbia University, 10 pages, 2005.

Jones, Matt, et al., "Sorting out Searching on Small Screen Devices," 15 pages, 2002.

Jones, Matt, et al., "Using a Mobile Device to Vary the Pace of Search," 5 pages, 2003.

Kovacevic, Milos, et al., "Recognition of Common Areas in a Web Page Using Visual Information: a possible application in a page classification," 8 pages, 2002.

Lin, Shian-Hua, et al., "Discovering Informative Content Blocks from Web Documents," SIGKDD '02, Jul. 23-26, 2002, Edmonton, Alberta, Canada, 6 pages.

Ma, Qiang, et al., "A Localnes-Filter for Searched Web Pages," 12 pages, 2003.

Milic-Frayling, Natasa, et al., "SearchMobil: Web Viewing and Search for Mobile Devices," WWW 2003, May 20-24, 2003, Budapest, Hungary, 8 pages.

Wen, Ji-Rong, et al., "Probabilistic Model for Contextual Retrieval," SIGIR '04, Jul. 25-29, 2004, Sheffield, South Yorkshire, UK, 7 pages.

Wobbrock, Jacob O., et al., "WebThumb: Interaction Techniques for Small-Screen Browsers," Human Computer Interaction Institute and School of Design, Carnegie Mellon University, Pittsburgh, Pennsylvania, 4 pages, 2002.

Yi, Lan, et al., "Eliminating Noisy Information in Web Pages for Data Mining," SIGKDD '03, Aug. 24-27, 2003, Washington, D.C., USA, 10 pages.

Jones, Steve, et al., "Using Keyphrases as search result surrogates on small screen devices," Department of Computer Science, University of Waikato, Hamilton, New Zealand, Feb. 3, 2004, 14 pages.

* cited by examiner

SYSTEMS AND METHODS TO PRESENT WEB IMAGE SEARCH RESULTS FOR EFFECTIVE IMAGE BROWSING

TECHNICAL FIELD

This disclosure relates to network search and retrieval systems.

BACKGROUND

With rapid improvements in both hardware and software technologies, large collections of images are available on networks such as the Web. End-users typically use web search engines to search the hundreds of million of images available on the Web for image(s) of interest. An end-user typically submits an image search according to information needs, which can be categorized with respect to a navigational, informational, or transactional context. A search submitted with respect to a navigational context is directed to locating a specific web resource. A search submitted with respect to an informational context, typically considered to most frequent type of search performed by users, is directed to a task of locating information about a particular topic or obtaining an answer to an open-ended question. A search submitted with respect to a transactional context is directed to performing a web-mediated activity such as software downloading, online shopping and checking e-mail.

Web image search results are typically presented to an end-user in a simple ranked list. Ranked lists are not conducive to browsing search results, especially when the image search is responsive to an informational search. In such a scenario, image(s) presented in a first page are typically not more relevant to the search query than image(s) associated with any following search result pages. As a result, end-users typically spend substantial amounts of time and energy navigating through web image search results to find one or more images of interest. Moreover, if the user wants to compare different search results using such a ranked-list, the user will typically need to sequentially scan the resulting images, one after another to find an image of interest, while devoting considerable efforts in page navigations.

SUMMARY

Systems and methods to present web image search results for effective image browsing are described. In one aspect, task-based attention objects for each of multiple images associated with image search results are generated. Thumbnail images from respective ones of the images are created as a function of at least the task-based attention objects. The thumbnail images emphasize image region(s) of greater priority to a user in view of a keyword or expanded keyword associated with the search results.

BRIEF DESCRIPTION OF THE DRAWINGS

In the Figures, the left-most digit of a component reference number identifies the particular Figure in which the component first appears.

DETAILED DESCRIPTION

Overview

A user typically has a specific goal or information need when conducting a task such as a web image search. Such tasks can encompass informational, navigational, or resource-based searching goals. In view of this, when a user submits a web search with a specific information need, different regions of returned image(s) will generally have differing levels of importance to the user. For example, suppose a user is trying to find a picture of an automobile (an exemplary task) on the Internet, and an image containing an automobile running along a sea-side road is returned by a search engine. In this scenario, the user would consider the ocean as background information—i.e., of less importance to the user than the automobile. If the same image is returned to the user when the user is trying to find an image of an "ocean", that portion of the image including the ocean will be of more interest to the user than the automobile. Existing image attention modeling techniques analyze an image to identify information objects such as saliency, face and text, and do not analyze an image to identify aspects of the image that are relevant to the user's specific search task/goal—e.g., finding an image of an automobile.

In contrast to such existing systems, the systems and methods to present web image search results for effective image browsing extend image attention analysis to accommodate a user task preference—that is, to include those regions of an image that are related to a user's task. With respect to a user task, the user has a goal/task to query for information about a particular topic. For each query, the user tries to locate one or more images most relevant to query terms. The number of relevant images is determined by the user. The systems and methods evaluate search result image similarity to present web image search results to a user in one or more customizable views.

To these ends, the systems and methods derive search result image similarity from multiple image property sources. Image property sources include any of image feature content, context of the image (e.g., a hypertext link, web page text or semantic features surrounding the image, etc.) with respect to an associated web page, and attention objects indicating prioritized attention region(s) of an image determined by task-oriented image attention analysis. Task-oriented image attention analysis determines which region(s) of an image are objectively more important to the user's search task.

More particularly, task-oriented search analysis is used to generate attention object(s) for each image returned from a web image search query. To this end, each returned image is analyzed to objectively identify most important regions of the image in view of a trained image attention model and in view of the particular search task of the user. The search task maps to a set of low level features including, for example, search query keyword(s) and keyword context. For instance if "ocean" is a keyword, the color of the ocean, for example, the color "blue" is keyword context to the keyword "ocean". Saliency and face objects are also identified from each image and added to the image's attention object.

A respective thumbnail image is created from each image's respective attention object. The thumbnails creation process crops or removes less informative regions (regions containing distracter attributes) from a sub-sampled version of the image to represent attention region(s) of the image having greater attention priority as compared to other region(s) of the image.

The multiple image similarity properties derived from each image, image context, and image attention object, define a similarity matrix used to determine a substantially optimal presentation for the corresponding thumbnails. To this end, the systems and methods implement multidimensional scaling (MDS) to map each thumbnail into a configurable two dimensional layout space. This is accomplished by treating inter-object dissimilarities as distances in high-dimensional space and approximating image dissimilarities in a low dimensional output configuration to preserve relations between images. These thumbnails are presented to a user in the configurable two-dimensional similarity-based or grid view layout.

These and other aspects of the systems and methods to present web image search results for effective image browsing are now described in greater detail.

An Exemplary System

Figure 1:
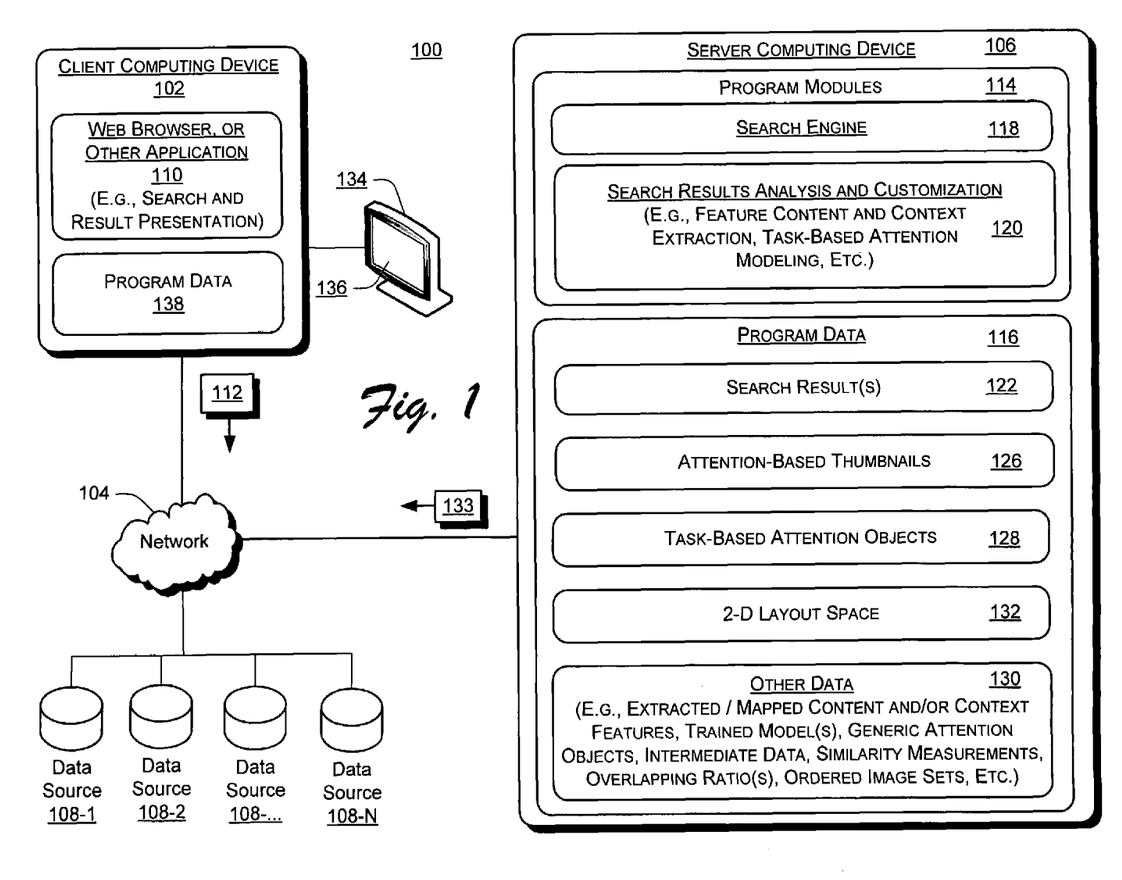
FIG. 1 illustrates an exemplary system to present web image search results for effective image browsing.

FIG. 1 illustrates an exemplary system 100 to present web image search results for effective image browsing. In this implementation, system 100 includes client computing device 102 coupled across a communications network 104 to server computing device 106. Server 106 is coupled to any number of data repositories 108-1 through 108-N. Network 104 may include any combination of a local area network (LAN) and a general wide area network (WAN) communication environments, such as those which are commonplace in offices, enterprise-wide computer networks, intranets, and the Internet. Client computing device 102 is any type of computing device such as a personal computer, a laptop, a server, small form factor mobile computing device (e.g., a cellular phone, personal digital assistant, or handheld computer), etc.

Client computing device 102 includes one or more program modules such as web browser 110 or other type of application to allow a user to search for one or more documents (e.g., web pages) comprising image(s) of interest. To this end, the web browser, or other application, permits the user to determine a search query 112 including one or more keywords. Web browser 110 or another application may expand the keyword(s) as a function of one or more known keyword expansion criteria to improve subsequent document search operations. Web browser 110 sends the search query 112 to server 106, and thereby, triggers the server to perform a keyword search process, and subsequent analysis and customization of search results to enhance user browsing of the search results.

To these ends, server 106 includes program modules 114 and program data 116. Program modules 114 include search engine 118 or an interface to a search engine deployed by a different search service server (not shown), and search results analysis and customization module 120. Responsive to receiving search query 112, search engine 118 searches or mines data source(s) 108 (108-1 through 108-N) for images (e.g., web page(s)) associated with the keyword(s) to generate search results 122. Search engine 118 can be any type of search engine such as a search engine deployed by MSN®, Google®, and/or so on. In this implementation, search results 122 are a ranked list of documents (e.g., web page(s)), including mined image(s), that search engine 118 determined to be related or relevant to the search query 112.

Image Feature Content Extraction and Context Mining

Search results analysis and customization module 120 determines similarity measurements between respective ones of the mined images as a function of properties derived from the images themselves and/or from context associated with the identified image(s). Search results analysis and customization module 120 utilizes the similarity measurements in view of identified image attention areas that have close correspondence to the user's specific search task to narrow spatial distribution between content and context of the mined images. Such a narrowed spatial distribution organizes the web image search results in a manner that increases information scent. Information scent is a subjective user perception of the value and cost of information sources obtained from proximal cues, such as thumbnails of an image representing a content source. This allows the systems and methods of system 100 to present attention-based thumbnails 126—derived from images, to a user in a substantially optimal manner (e.g., to enable efficient browsing of the presented image collection, facilitate location of a specific subset of image(s), and/or compare similar images).

To these ends, search results analysis and customization module 120 extracts features from content of each mined image as a whole, and also identifies features associated with context corresponding to each mined image. Features extracted from the image as a whole include, for example, color moments, correlogram, and wavelet texture. Techniques to extract image features are known.

To obtain features associated with context corresponding to each mined image, search results analysis and customization module 120 mines information scent, or local cue(s) associated with the images to assess and navigate towards information resources that may provide additional information associated with the image. Such cues include, for example, a hypertext link or navigation path to an image, web page text and/or semantic features surrounding the image, time, geographic location, and/or so on. The local cue(s) may provide indication(s) of the utility or relevance of a navigation path for information foraging.

Task-Oriented Image Analysis

A task-based attention modeling logic portion of search results analysis and customization module 120 determines which region(s) of a mined image are objectively more important to a user's search task. To this end, the task-based attention modeling logic generates a respective visual task-based attention model for each mined image (image(s) associated with search results 122). The visual task-based attention model includes one or more attention objects 128 to indicate prioritized attention region(s) of a mined image as a function of the user's search task. The visual attention model for a mined image is defined as a set of attention objects:

$$\{AO_i\}=\{(ROI_i, AV_i)\}, 1 \leq i \leq N \quad (1)$$

wherein $AO_i$ represent an $i^{th}$ attention object within the image, $ROI_i$ represents a Region-Of-Interest of $AO_i$, $AV_i$ represents an attention value of $AO_i$, and N represents a total number of attention objects 128 derived from the mined image. The ROI is a spatial region within the image that corresponds to an attention object. Attention value (AV) is a quantified value indicates the weight of each attention object 128 in contribution to the information contained in the original mined image.

The task-based attention modeling logic builds an attention object 128 (also referred to an attention model) for each returned mined image. This is accomplished by mapping a user task to a set of low-level features, extracting the task related region objects of each image, and then adding these regions to generate the attention model 128 of the mined image. The mapping is based on an image thesaurus which can be constructed from a large number of Web images and their annotations. For example, if it is found that many images containing blue regions come with annotation "ocean", then we can map the word "ocean" to a low level feature of blue color. Therefore, when a user searches for "ocean", we can decide that blue region in a resulting image is very possibly to be more important. For purposes of illustration, such a feature mapping and extracted region(s) are shown as respective portions of "other data" 130.

Task-based attention modeling logic (a respective portion of search results analysis and customization module 120) also identifies basic attention objects such as saliency and face objects. Exemplary operations to identify basic or generic attention objects are described in U.S. patent application titled "Systems and Methods for Enhanced Image Adaptation", Ser. No. 10/371,125, filed on Feb. 20, 2003, commonly owned herewith, and incorporated by reference. In one implementation, image segmentation, saliency and face object detection operations to detect basic attention object(s) are executed offline.

Attention-Based Thumbnail Generation

Search results analysis and customization module 120, for each mined image, generates a respective task-based thumbnail image 128 for each task-based attention object 128 associated with a mined image. The thumbnail creation process crops or removes less informative regions (regions containing distracter attributes) from a sub-sampled version of a mined image to represent attention region(s) of the mined image having greater attention priority as compared to other region(s) of the mined image. Thus, spatial resources of a thumbnail 126 are used in a substantially efficient manner. As described below, thumbnails 126 are mapped to a two-dimensional layout space 132 for user viewing and browsing. Exemplary such layouts for presentation on a display 134 are shown in FIGS. 2 through 7.

Attention-Based Similarity Measurement

Search results analysis and customization module 120, generates image similarity measurements from mined images. Such similarity measurements are shown as respective portions of "other data" 130. The similarity measurements are generated based on one or more properties of respective mined images. The properties include, for example, a web link, surrounding text or semantic features.

Search results analysis and customization module 120 adopts two sources of information to evaluate the image similarity information: one is the content feature of the whole image and the other comes from attention regions of the image provided by attention objects 128, so as to incorporate the semantic concept of image into the similarity measurement. The multiple image similarity properties derived from each mined image, image context, and image attention object(s) 128, define a similarity matrix.

In this implementation, similarity of image item and an attention region is measured as Euclidean distance:

$$IM_{ij}=\|FV_i-FV_j\|; \quad (2), \text{ and}$$

$$RM_{ij}=\|FV_{AR_i}-FV_{AR_j}\|; \quad (3),$$

wherein IM is the image similarity matrix, which is referred as the similarity between image $I_i$ and $I_j$; RM is the region similarity matrix, which is referred as the similarity between the attention region of image $I_i$ and $I_j$.

A final similarity measurement between two images is the combination of above two similarity matrix:

$$VM_{ij}=\alpha RM_{ij}+(1-\alpha)IM_{ij} \quad (4),$$

wherein $\alpha$ is the weight to achieve a balance between overall similarity, which represents content of the entire mined image, and attention region similarity, which represents the attributes of the mined image preferred by a user as defined by the search task.

Exemplary Similarity-Based Image Search Results Presentation

Figure 2:
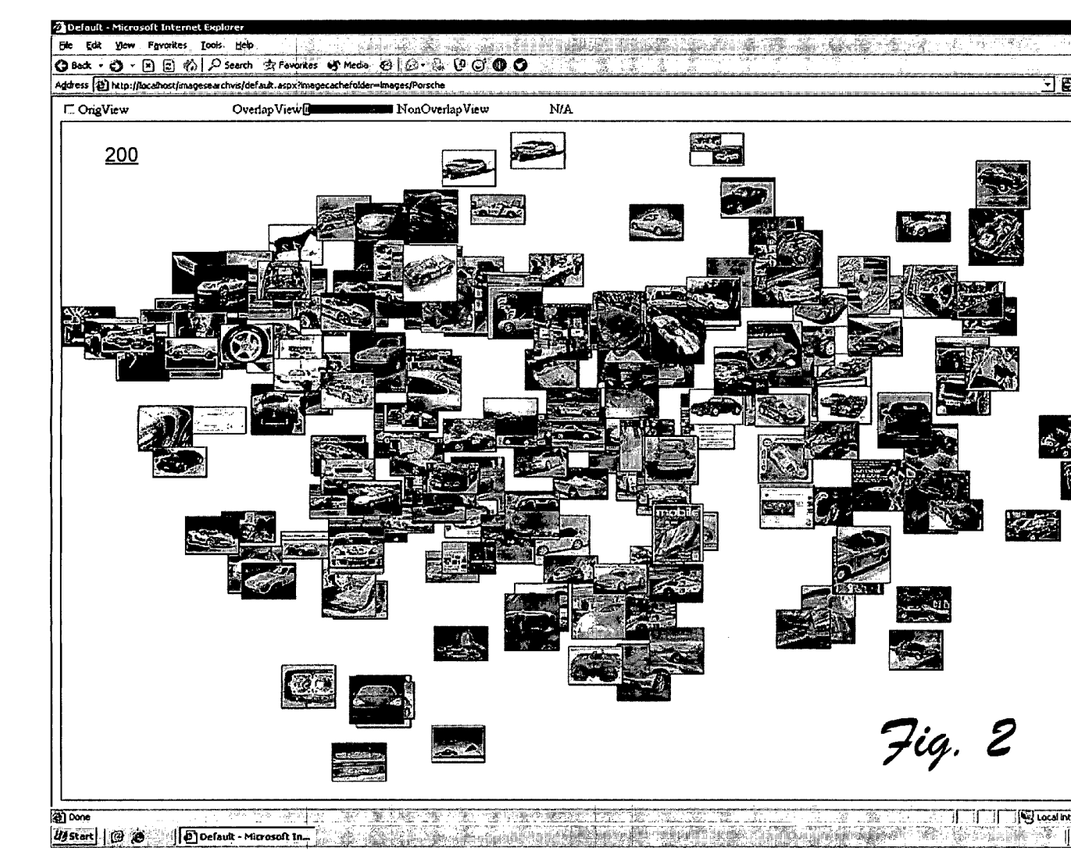
FIG. 2 shows an exemplary user interface presenting attention-based image thumbnails with an overlapping adjustment of $\gamma=1$.

FIG. 2 presents a user interface 200 illustrating an exemplary presentation of attention-based thumbnails 128 with an overlapping adjustment of $\gamma=1$. More particularly, and given the image similarity matrix VM, search analysis module 120 employs Multidimensional Scaling (MDS) to map each attention-based thumbnail 128 into two-dimensional layout space 132 for presentation on display 134. MDS achieves this objective by treating inter-object dissimilarities as distances in high dimensional space, and approximating them in a low dimensional output configuration. Inter-object dissimilarities are determined in view of respective object similarity measurements. In this way, similar attention-based thumbnails 126 are positioned in close proximity to one another and relations between image items are well preserved as shown in FIG. 2.

Since overlapping layout of similarity-based visualization may hide a portion of one or more images, when two images reside in close proximity to one another in 2-D layout space 132, search results analysis and customization module 120 determines their relationship in Z-dimension (perpendicular to the plane of the display panel) by the ranking returned by search engine 118 (i.e., in search results 122). That is, an image (i.e., attention-based thumbnail 126) of higher ranking is given precedence and presented in front of a different image of lower ranking.

The 2-D layout 132 is communicated to the client computing device 102 in a message 133.

Fitting an Image to a Grid View

Although a small degree of overlapping of attention-based thumbnails 126 will not affect user understanding of associated image content, aggressive overlapping may prevent users from finding certain images. In addition, such an overlapping design may produce a very high visual density. This is because strong information scent expands the spotlight of attention, whereas crowding of targets in a compressed region narrows it. Search results analysis and customization module 120 implements a control scheme to customize and control a balance between information scent and density collection presentation of attention-based thumbnails 128 mapped to 2-D layout space 132. To this end, the application 110 presents the 2-D layout space 132 as a 2-D grid view to fit all attention-based thumbnails 128 into the grid, while substantially maximizing original similarity relationships.

To this end, and in one implementation, application 110 implements a grid algorithm with a space requirement of $O(m^2)$ and a time requirement of $O(m^2)+O(n^2)$, wherein m is the grid length and n is the number of images in the configuration. Although this grid view algorithm preserves distances between most closely related objects, i.e. thumbnails, the space/time requirement is relatively high. Human vision is typically not very sensitive to an absolute grid relationship between each image item of multiple images. At the same time, the space/time requirement of the algorithm is useful for rendering the grid view in real time. In view of this and in another implementation, an alternative grid algorithm is also provided to achieve a balance between grid precision and a space/time requirement.

More specifically, consider that X and Y are respectively a number of images that can be displayed on a column or a row of an image presentation panel (i.e., display 134). Let $I=\{I_i (x_{Sim}, y_{Sim})|1 \leq i \leq M\}$ be the returned image dataset (mined images or search results 122), where M is the number of images, $(x_{Sim}, y_{Sim})$ is spatial position of $I_i$ in two-dimensional visual space. Let $J=\{1, 2, \ldots, M\}$ be an index set. Application 110 orders image set $I_1, I_2, \ldots, I_M$ to a sequence $I_{\phi(1)}, I_{\phi(2)}, \ldots, I_{\phi(M)}$ such that $I_{\phi(i)}(x_{Sim}) < I_{\phi(j)}(x_{Sim})$ for i<j, where φ is a permutation of the index set J. For each $\{s\}=\{s|s\in I, \max(s+1)\cdot Y<M\}$, denote $K_s=\{sY+1, sY+2, \ldots, sY+Y\}$ an index set, reorder image subset $I_s=\{I_{\phi(sY+1)}, I_{\phi(sY+2)}, \ldots, I_{\phi(sY+Y)}\}$ to a sequence $I_{\psi(\phi(sY+1))}, I_{\psi(\phi(sY+2))}, \ldots, I_{\psi(\phi(sY+Y))}$ such that $I_{\psi(\phi(sY+i))}(y_{Sim}) < I_{\psi(\phi(sY+j))}(y_{Sim})$, for i<j, where ψ is a permutation of the index set $K_s$.

$$I_i(x_{Grid})=\lfloor \psi(\phi(i))/Y \rfloor \quad (5)$$

$$I_i(y_{Grid})=\psi(\phi(i)) \bmod Y \quad (6)$$

For purposes of illustration, such ordered image sets are shown as respective portions of "program data" 130.

Since $x_{Grid}$ and $y_{Grid}$ in Equation (5) (6) are integers, application 110 normalizes the integers to fit into the image panel. Note that X and Y are interchangeable, representing a grid algorithm of optimization in one dimension and sub-optimization in another. Application 110 employs a quick sort method, wherein the time and space requirement of the new algorithm is $O(2n \log(n)-n \log(m))$, where n is the number of image items, or thumbnails 126 and m is the number of columns or rows.

Dynamic Overlapping Adjustment

A best overlapping ratio depends on both aspects of the image collection and the user. For instance, a user's image viewing strategy is generally driven by such specific information needs. Characteristics of underlying image data sets may have substantial bearing on the effectiveness of image presentation approaches. For example, home photos are generally best browsed in a chronicle order, by location, or by person. In another example, images in a professional photo database are typically best presented in a random presentation, rather than in a similarity-based image presentation. This is because, when images are classified into different categories, as images in professional image libraries generally are, image(s) of interest will generally have high contrast with respect to neighboring image(s) when they are presented in a random organization.

Though search results analysis and customization module 120 may generate respective overlapping ratios automatically using similarity-based overview and grid view algorithms, as described above, it is possible that such automatically generated values may not satisfy the user's requirement (e.g., due to information loss caused by overlapping or relationship loss caused by grid algorithm). In view of this, a user is allowed to adjust/customize the overlapping ratio—i.e., the spatial position of attention-based thumbnails 126 with respect to 2-D layout 132 to modify the overlapping ratio of the presentation via web browser 110. In one implementation, this is accomplished by a slider bar user interface control and scripts communicated from server 106 to client 102.

Search results analysis and customization module 120 determines a position where a thumbnail 126 is to be positioned within 2-D layout space 132 as follows:

$$P_{new}^i = \gamma P_{Sim}^i + (1-\gamma) P_{Grid}^i \quad (7),$$

wherein γ is the overlapping ratio, $P_{Sim}$ and $P_{Grid}$ is a spatial position where image resides in the similarity-based overview and/or the grid view (2-D layout space 132). The user adjusts the overlapping ratio r to achieve a suitable presentation.

Figure 3:
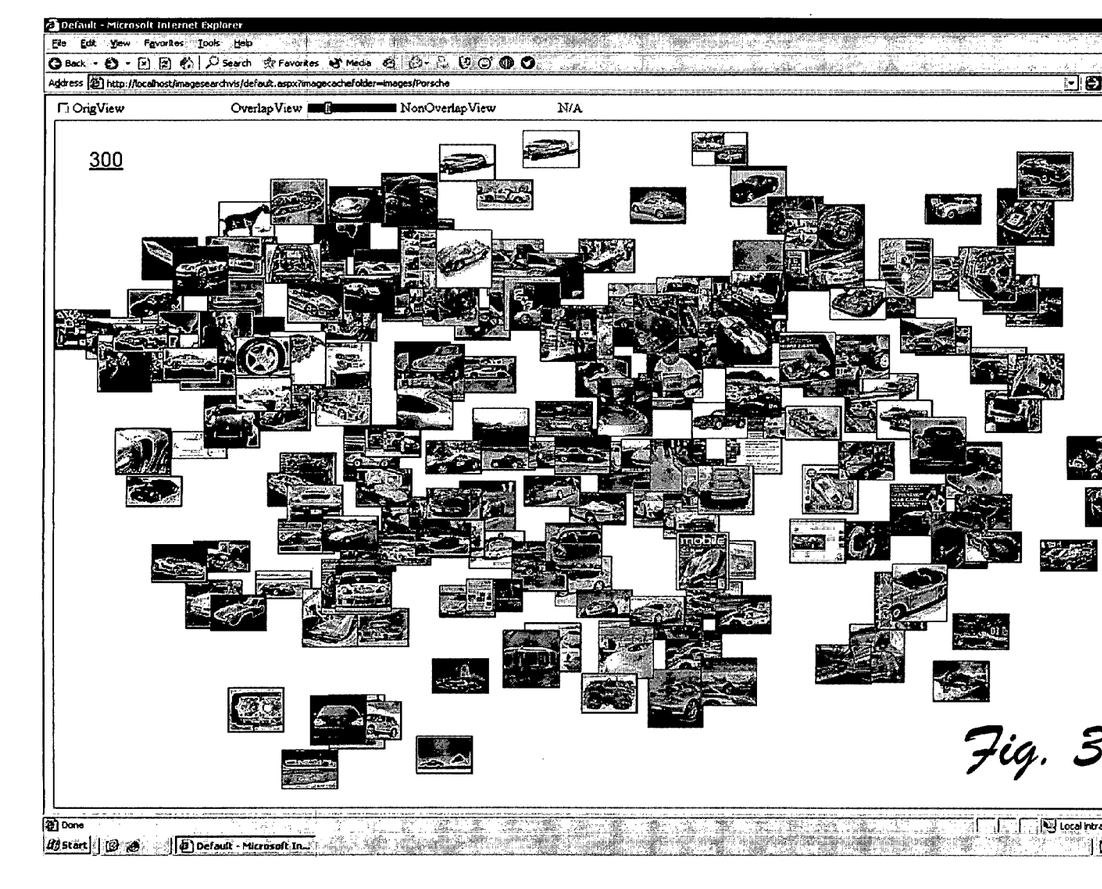
FIG. 3 shows an exemplary user interface for presenting a similarity-based layout of attention-based image thumbnails with overlap ratio of $\gamma=0.75$.
Figure 4:
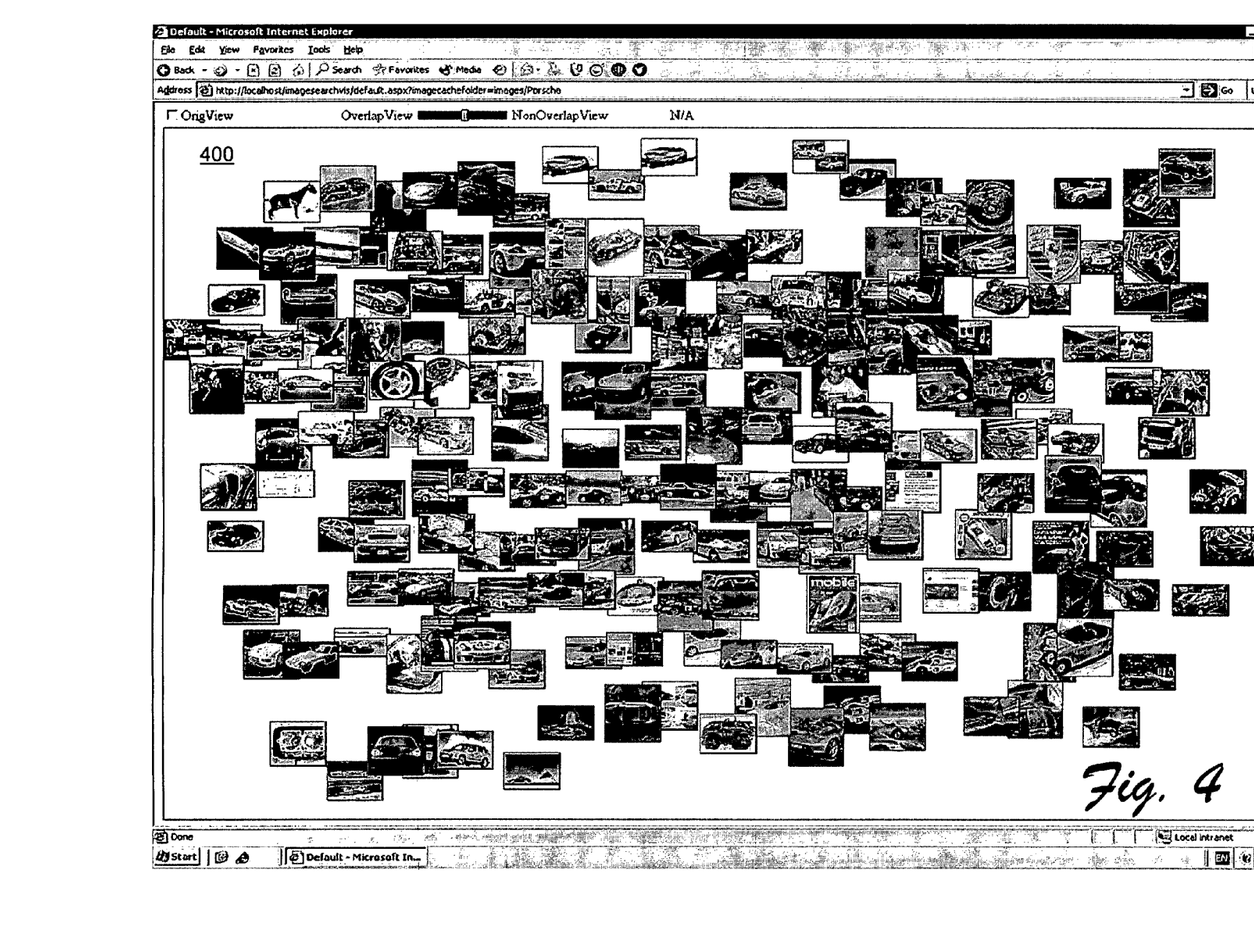
FIG. 4 shows a user interface illustrating an exemplary similarity-based presentation of attention-based image thumbnails with overlap ratio of $\gamma=0.5$.
Figure 5:
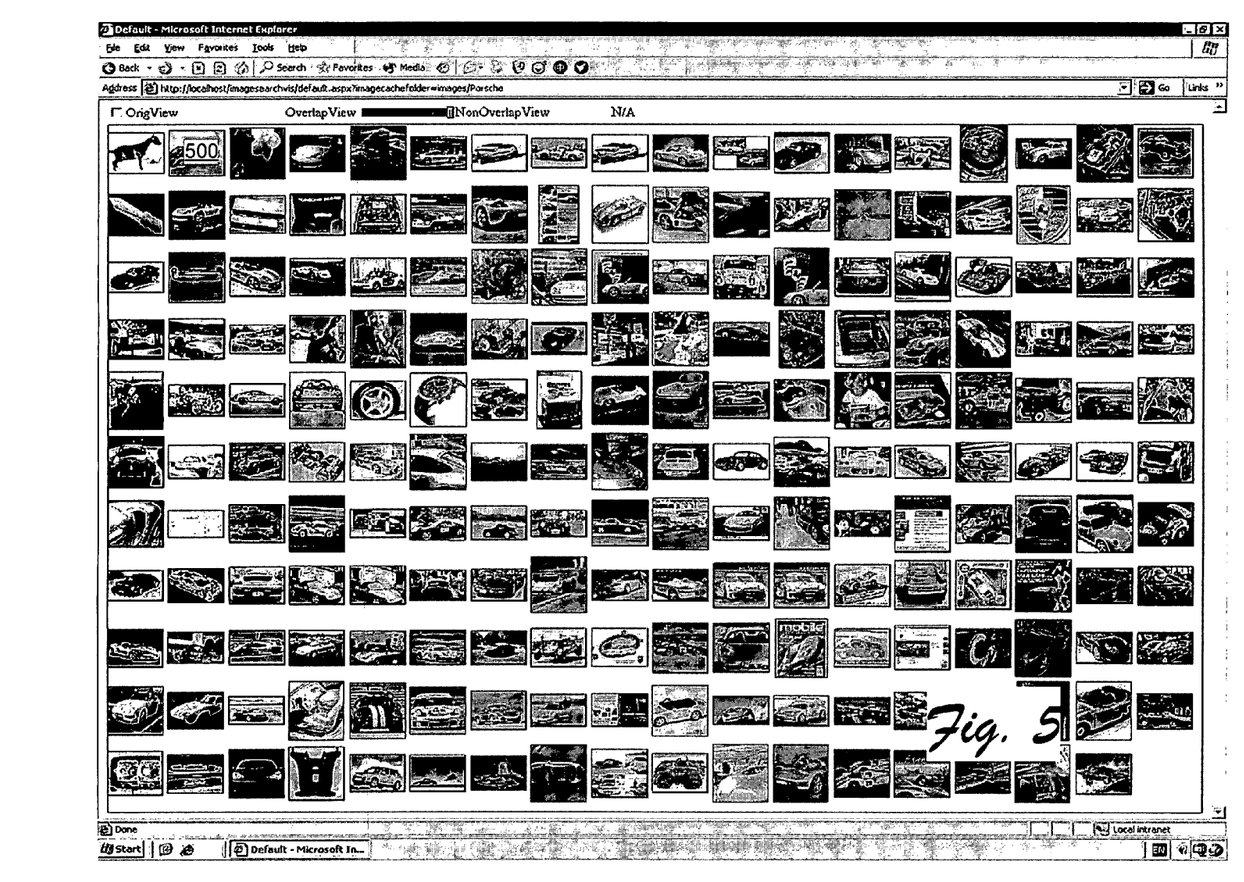
FIG. 5 shows a user interface illustrating an exemplary grid view presentation of attention-based image thumbnails with overlap ratio of $\gamma=0.0$.

FIGS. 2 through 5 illustrate exemplary user interfaces, each respectively illustrating overlapping adjustment of attention-based thumbnails 128 with respect to 2-D layout space 132. Such user interfaces are collectively represented by user interface 136 of FIG. 1. More particularly, FIG. 2 shows a user interface illustrating an exemplary similarity-based overlap ratio of γ=1.0. FIG. 3 shows a user interface illustrating an exemplary similarity-based presentation of attention-based image thumbnails with overlap ratio of γ=0.75. FIG. 4 shows an exemplary similarity-based overlap ratio of γ=0.5. FIG. 5 shows an exemplary grid view with an overlap ratio of γ=0.0.

Exemplary Fisheye View

Since users are typically interested in viewing less than an entire image collection, a user will generally appreciate the ability to present a portion of an image collection in a clear manner. The systems and methods of system 100 of FIG. 1, and more particularly web browser 110 (or other application) allow the user to customize a current image view by selecting an attention-based thumbnail 126 of interest (e.g., via a mouse click) to generate a fisheye view. For a fisheye view, web browser 110 formats the selected item in the 2-D layout 132 in an analogue of fisheye lens for presentation on display 134 to present both local detail and global context information simultaneously with respect to the selected item.

Figure 6:
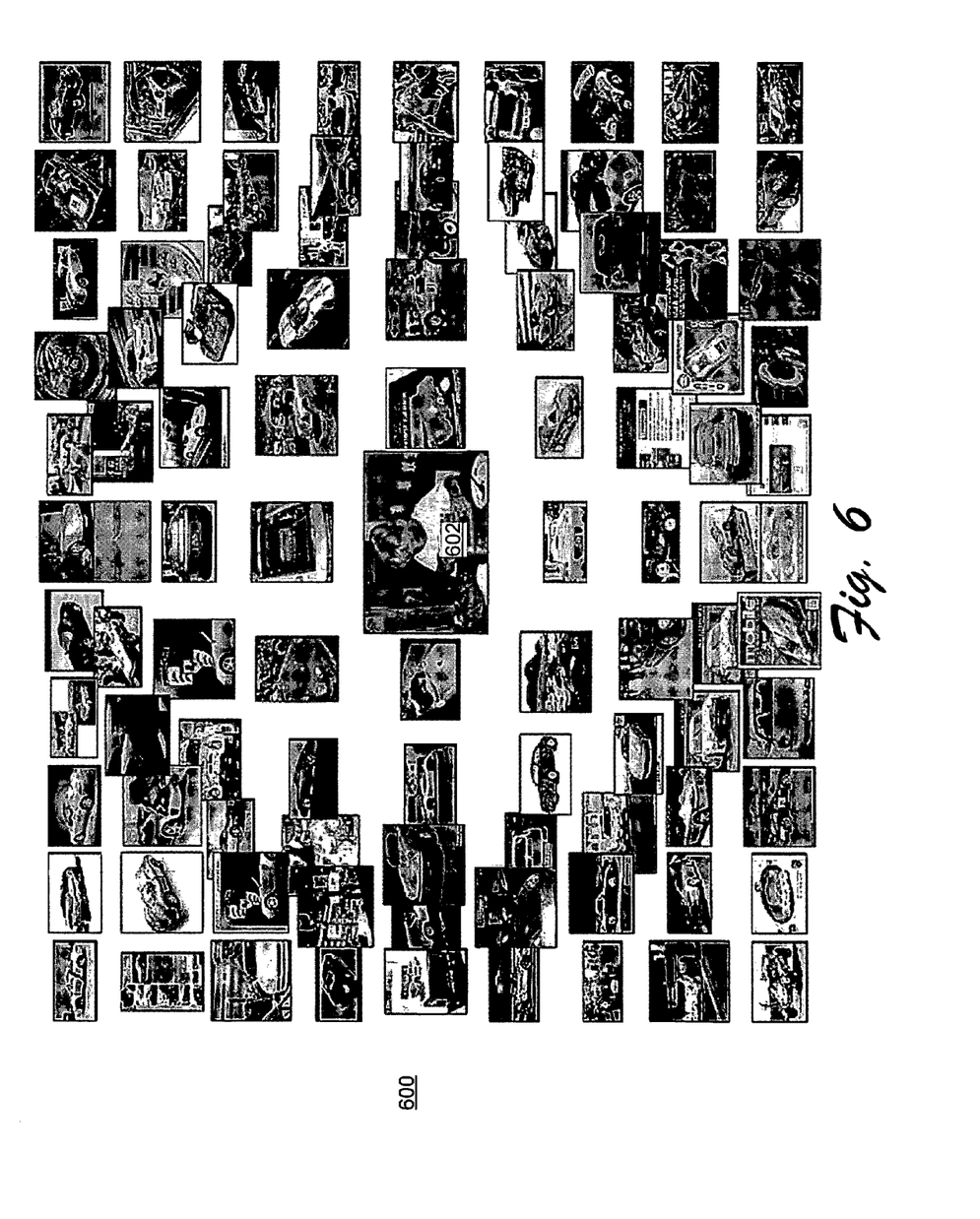
FIG. 6 shows an exemplary fisheye view to present local detail and global context information simultaneously with respect to a selected attention-based thumbnail.
Figure 7:
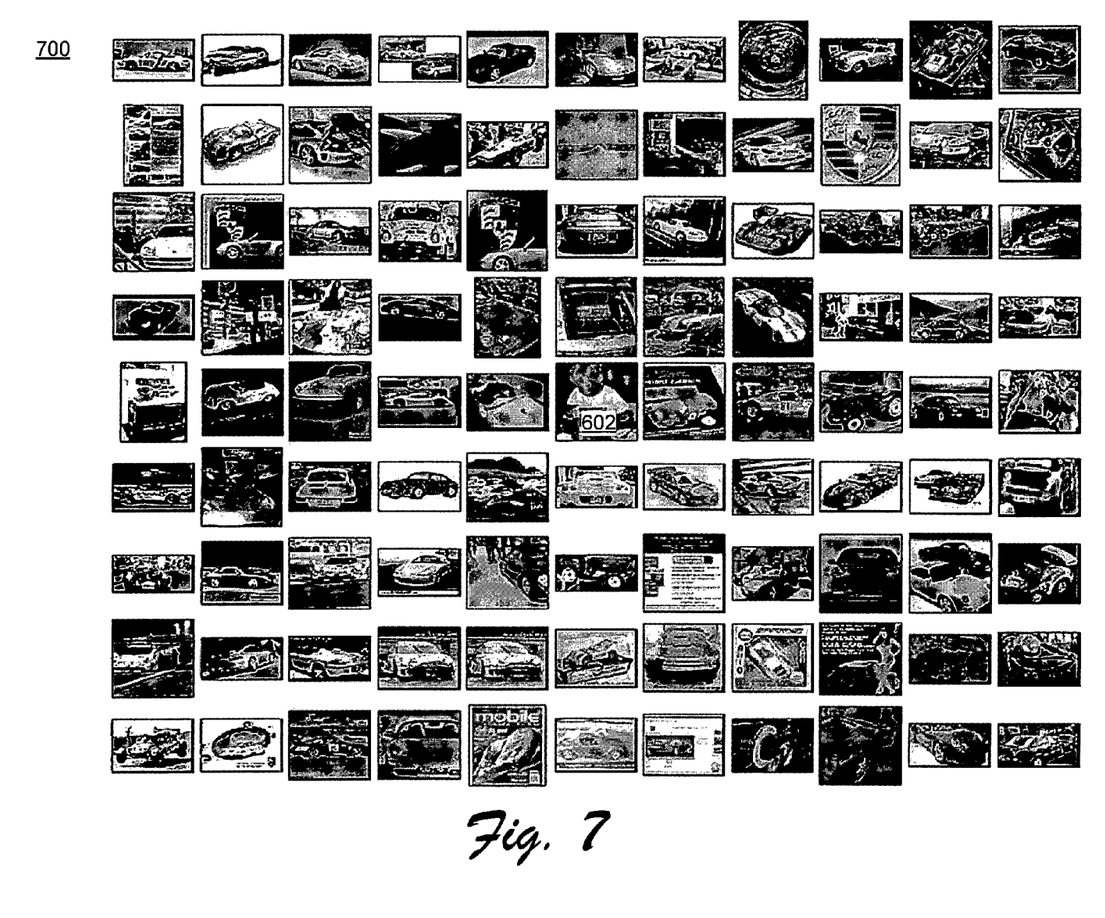
FIG. 7 shows an exemplary similarity-based layout of attention-based thumbnails prior to selection of a particular thumbnail for presentation in a fisheye view of FIG. 6.

FIG. 6 shows an exemplary fisheye view 600 presenting local detail and global image context information simultaneously with respect to a selected attention-based thumbnail 602. FIG. 7 shows an exemplary similarity-based layout 700 of attention-based thumbnails prior to selection of the attention-based thumbnail 602 for presentation in the fisheye view of FIG. 6. Referring to FIG. 6, search results analysis and customization module 120 implements a distorted polar coordinate system to distort only the spatial relationship of images mapped to the 2-D layout 132. At the same time, web browser 110 substitutes the selected attention-based thumbnail 128 (the focus image) with the corresponding mined image (the original (non-cropped) image). The 2-D layout 132 is configured such that position of image(s) further away from the focus image will appear slightly squashed. That is, the further image items are positioned away from the focus, the closer they will appear when the 2-D layout 132 is presented on display 134. In the example of FIG. 6, the distortion rate is configured as 0.5.

An Exemplary Procedure for Presenting Web Image Search Results

Figure 8:
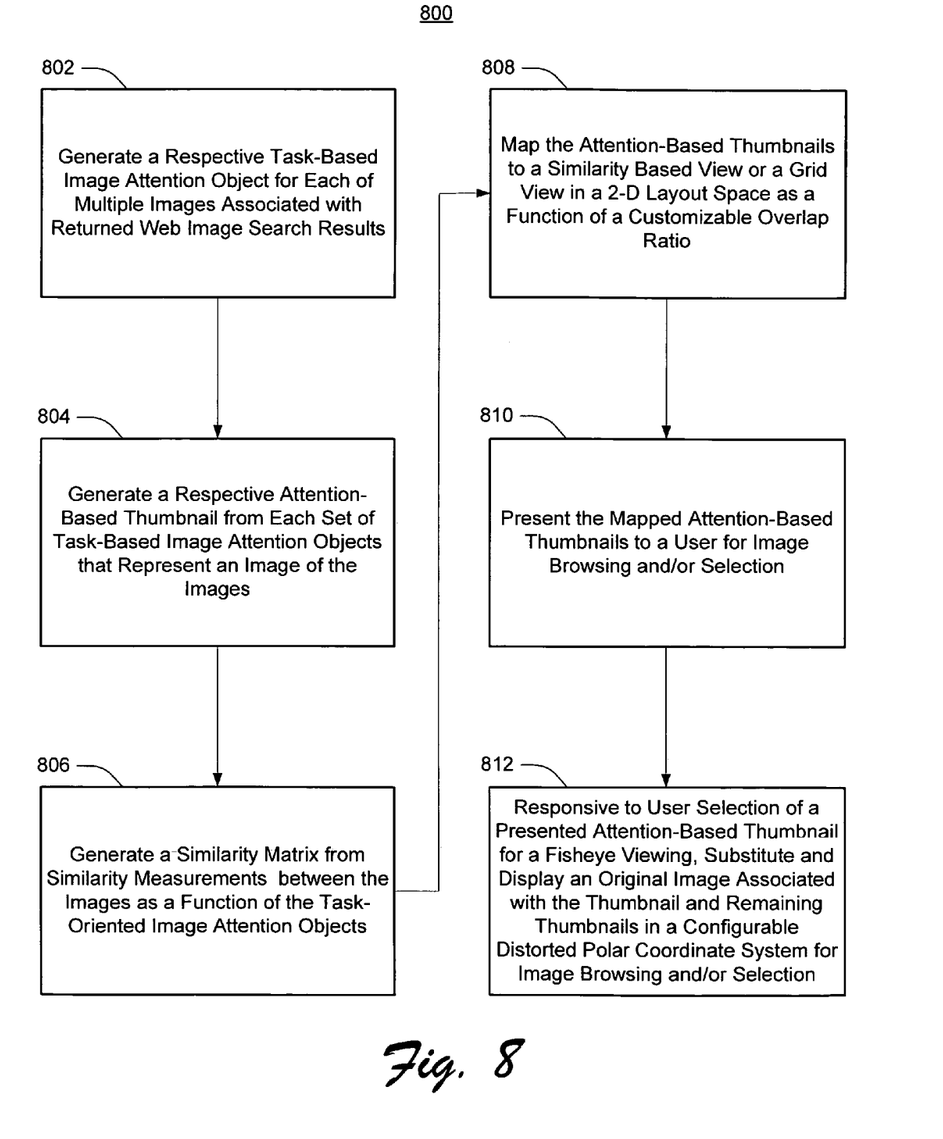
FIG. 8 shows an exemplary procedure to present web image search results for effective image browsing.

FIG. 8 shows an exemplary procedure 800 to present web image search results for effective image browsing. Although the operations of the procedure are described below in a particular order, the operations of the procedure may be executed in different order(s). For example, the following description details operations of block 804, which generate attention-based thumbnails, before detailing operations of block 806, which generate a similarity matrix. However, in another implementation, operations of block 806 to generate the similarity matrix may be performed before the operations of block 804, which generates thumbnails. Additionally, and for purposes of illustration, the operations of the procedure are described with respect to components of FIG. 1. The left-most digit of a component reference number identifies the particular figure in which the component first appears.

At block 802, search results analysis and customization module 120 (FIG. 1) generates a respective task-based attention object 128 for each of multiple images (mined images) associated with search results 122. Each task-based attention object 128 indicates prioritized attention region(s) of a mined image as a function of a user's search task. This is accomplished by mapping a user task (e.g., an image search for a particular object or topic) to a set of low-level features, extracting the task related region objects of each image, and then adding these regions to generate the attention model 128 of the mined image.

The operations of block 802 also identify basic attention objects (e.g, saliency object(s), face object(s), and/or the like) in the images. These basic attention objects are added to respective ones of the task-based attention objects 128.

At block 804, search results analysis and customization module 120, for each mined image, generates a respective task-based thumbnail image 128 for each task-based attention object 128 associated with the mined image 130. The thumbnail creation process crops or removes less informative regions (regions containing distracter attributes) from a sub-sampled version of the mined image to represent attention region(s) 128 of the mined image having greater attention priority as compared to other region(s) of the image.

At block 806, search results analysis and customization module 120 generates a similarity matrix indicating similarity between respective ones of mined images. To this end, search results analysis and customization module 120 extracts features from content of each mined image as a whole, and also identifies features associated with context corresponding to each mined image. Search results analysis and customization module 120 also uses attention regions of the image provided by attention objects 128 to evaluate image similarity. The multiple image similarity properties derived from each mined image, image context, and image attention object(s) 128, define the similarity matrix. At block 808, search results analysis and customization module 120 maps the attention-based thumbnails 128 to a similarity based view or grid view in a 2-D layout space 132 as a function of a customizable image overlap ratio. This 2-D layout space is made available to an application such as web browser 110 for presentation to a user.

At block 810, web browser 110 presents the mapped attention-based thumbnails 126 on a display device 134 for user browsing and selection. The user interface used to present the mapped attention-based thumbnails 126 allows the user to dynamically modify an image overlap ratio to manipulate how the thumbnails are presented to the user. The user interface, for example, via a context sensitive menu item, also allows the user to select a thumbnail 126 and indicate that the selection is to be presented in a fisheye view. At block 812, responsive to user selection of a particular attention based thumbnail 126 for fisheye viewing, search results analysis and customization module 120, responsive to request by the web browser 110, substitutes the selected attention-based thumbnail 128 (the focus image) with a corresponding mined image (the original (non-cropped) image). Search results analysis and customization module 120 configures the 2-D layout 132 such that position of image(s) further away from the focus image will appear slightly squashed. That is, the further image items are positioned away from the focus, the closer they will appear when the 2-D layout 132 is presented on display 134 (e.g., see FIG. 6). This fisheye view of 2-D layout 132 is communicated to client 102 for presentation to the user by web browser 110.

An Exemplary Operating Environment

Although not required, the systems and methods to present web image search results for effective image browsing are described in the general context of computer-executable instructions (program modules) being executed by a computing device such as a personal computer. Program modules generally include routines, programs, objects, components, data structures, etc., that perform particular tasks or implement particular abstract data types. While the systems and methods are described in the foregoing context, acts and operations described hereinafter may also be implemented in hardware.

Figure 9:
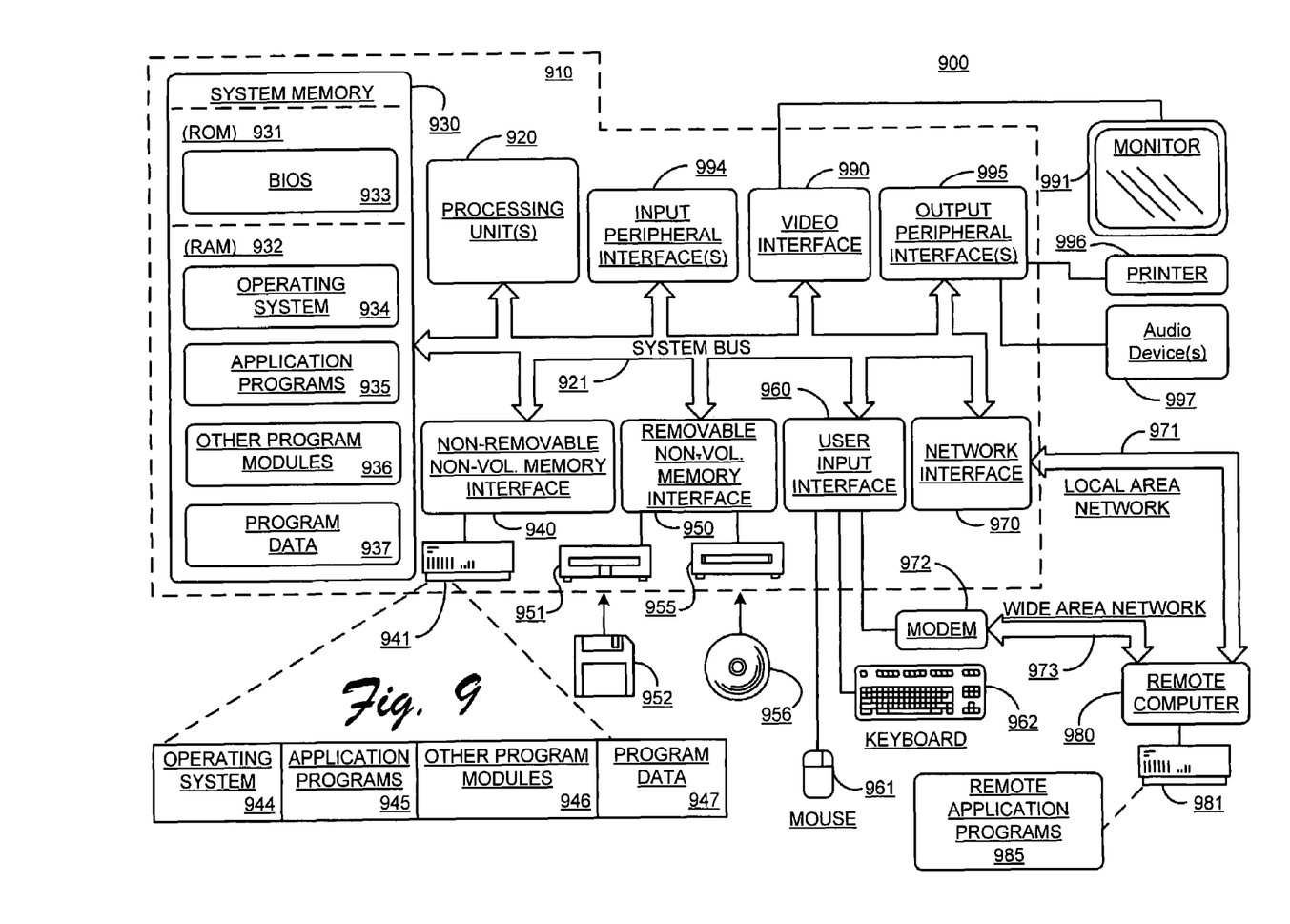
FIG. 9 shows an example of a suitable computing environment in which systems and methods to present web image search results for effective image browsing may be fully or partially implemented.

FIG. 9 illustrates an example of a suitable computing environment in which generating and presenting web image search results for effective image browsing may be fully or partially implemented. Exemplary computing environment 900 is only one example of a suitable computing environment for the exemplary system of FIG. 1 and exemplary operations of FIG. 8, and is not intended to suggest any limitation as to the scope of use or functionality of systems and methods the described herein. Neither should computing environment 900 be interpreted as having any dependency or requirement relating to any one or combination of components illustrated in computing environment 900.

The methods and systems described herein are operational with numerous other general purpose or special purpose computing system, environments or configurations. Examples of well-known computing systems, environments, and/or configurations that may be suitable for use include, but are not limited to, personal computers, server computers, multiprocessor systems, microprocessor-based systems, network PCs, minicomputers, mainframe computers, distributed computing environments that include any of the above systems or devices, and so on. Compact or subset versions of the framework may also be implemented in clients of limited resources, such as handheld computers, or other computing devices. The invention is practiced in a distributed computing environment where tasks are performed by remote processing devices that are linked through a communications network. In a distributed computing environment, program modules may be located in both local and remote memory storage devices.

With reference to FIG. 9, an exemplary system 900 illustrates an example of a suitable computing environment in which systems and methods to generate and present web image search results for effective image browsing may be fully or partially implemented. System 900 includes a general purpose computing device in the form of a computer 910 implementing, for example, client computer 102 of FIG. 1. Components of computer 910 may include, but are not limited to, processing unit(s) 920, a system memory 930, and a system bus 921 that couples various system components including the system memory to the processing unit 920. The system bus 921 may be any of several types of bus structures including a memory bus or memory controller, a peripheral bus, and a local bus using any of a variety of bus architectures. By way of example and not limitation, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

A computer 910 typically includes a variety of computer-readable media. Computer-readable media can be any available media that can be accessed by computer 910 and includes both volatile and nonvolatile media, removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 910.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example and not limitation, communication media includes wired media such as a wired network or a direct-wired connection, and wireless media such as acoustic, RF, infrared and other wireless media. Combinations of the any of the above should also be included within the scope of computer-readable media.

System memory 930 includes computer storage media in the form of volatile and/or nonvolatile memory such as read only memory (ROM) 931 and random access memory (RAM) 932. A basic input/output system 933 (BIOS), containing the basic routines that help to transfer information between elements within computer 910, such as during start-up, is typically stored in ROM 931. RAM 932 typically contains data and/or program modules that are immediately accessible to and/or presently being operated on by processing unit 920. By way of example and not limitation, FIG. 9 illustrates operating system 934, application programs 935, other program modules 936, and program data 937.

The computer 910 may also include other removable/non-removable, volatile/nonvolatile computer storage media. By way of example only, FIG. 9 illustrates a hard disk drive 941 that reads from or writes to non-removable, nonvolatile magnetic media, a magnetic disk drive 951 that reads from or writes to a removable, nonvolatile magnetic disk 952, and an optical disk drive 955 that reads from or writes to a removable, nonvolatile optical disk 956 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 941 is typically connected to the system bus 921 through a non-removable memory interface such as interface 940, and magnetic disk drive 951 and optical disk drive 955 are typically connected to the system bus 921 by a removable memory interface, such as interface 950.

The drives and their associated computer storage media discussed above and illustrated in FIG. 9, provide storage of computer-readable instructions, data structures, program modules and other data for the computer 910. In FIG. 9, for example, hard disk drive 941 is illustrated as storing operating system 944, application programs 945, other program modules 946, and program data 947. Note that these components can either be the same as or different from operating system 934, application programs 935, other program modules 936, and program data 937. Application programs 935 include, for example, web browser (or other application) 110 or program modules 114 of FIG. 1. Program data 937 includes, for example, program data 116 or 138 of FIG. 1. Operating system 944, application programs 945, other program modules 946, and program data 947 are given different numbers here to illustrate that they are at least different copies.

A user may enter commands and information into the computer 910 through input devices such as a keyboard 962 and pointing device 961, commonly referred to as a mouse, trackball or touch pad. Other input devices (not shown) may include a microphone, joystick, game pad, satellite dish, scanner, or the like. These and other input devices are often connected to the processing unit 920 through a user input interface 960 that is coupled to the system bus 921, but may be connected by other interface and bus structures, such as a parallel port, game port or a universal serial bus (USB).

A monitor 991 or other type of display device is also connected to the system bus 921 via an interface, such as a video interface 990. In addition to the monitor, computers may also include other peripheral output devices such as printer 996 and audio devices 997, which may be connected through an output peripheral interface 995.

The computer 910 operates in a networked environment using logical connections to one or more remote computers, such as a remote computer 980. In one implementation, remote computer 950 represents server computing device 106 of FIG. 1. The remote computer 980 may be a personal computer, a server, a router, a network PC, a peer device or other common network node, and as a function of its particular implementation, may include many or all of the elements (e.g., program module(s) 114 and program data 116, etc.) described above relative to the computer 910, although only a memory storage device 981 has been illustrated in FIG. 9. The logical connections depicted in FIG. 9 include a local area network (LAN) 981 and a wide area network (WAN) 983, but may also include other networks. Such networking environments are commonplace in offices, enterprise-wide computer networks, intranets and the Internet.

When used in a LAN networking environment, the computer 910 is connected to the LAN 971 through a network interface or adapter 970. When used in a WAN networking environment, the computer 910 typically includes a modem 972 or other means for establishing communications over the WAN 973, such as the Internet. The modem 972, which may be internal or external, may be connected to the system bus 921 via the user input interface 960, or other appropriate mechanism. In a networked environment, program modules depicted relative to the computer 910, or portions thereof, may be stored in the remote memory storage device. By way of example and not limitation, FIG. 9 illustrates remote application programs 985 as residing on memory device 981. The network connections shown are exemplary and other means of establishing a communications link between the computers may be used.

Conclusion

Although the systems and methods to present web image search results for effective image browsing have been described in language specific to structural features and/or methodological operations or actions, it is understood that the implementations defined in the appended claims are not necessarily limited to the specific features or actions described. Rather, the specific features and operations are disclosed as exemplary forms of implementing the claimed subject matter.

The invention claimed is:

1. A computer implemented method executed by a processor for presenting web image search results, the method comprising:
   generating task-based attention objects for each of multiple images associated with image search results returned by a search engine;
   creating thumbnail images from respective ones of the images as a function of at least the task-based attention objects to emphasize image region(s) of greater priority to a user in view of a keyword or an expanded keyword associated with the search results;
   calculating similarity measurements between the images as a function of one or more of content of the task-based attention objects and features associated with the images as a whole, the features comprising one or more of features extracted from the images and context associated with the images; and
   mapping the thumbnail images to a 2-D layout space for presentation to the user as a function of the similarity measurements,
   wherein the mapping comprises positioning thumbnail images with similar task-based attention objects in close proximity to one another and positioning thumbnail images with a higher search engine rank in front of thumbnail images with a lower search engine rank; and
   wherein the similarity is measured by: $VM_{ij}=\alpha RM_{ij}+(1-\alpha)IM_{ij}$, wherein IM is an image similarity matrix between an ith image ($I_i$) and a jth image ($I_j$), RM is a region similarity matrix between an attention region of $I_i$ and $I_j$, and $\alpha$ is a weight to factor in overall similarity and attention region similarity, wherein the overall similarity represents content of a mined image.

2. A method as recited in claim 1, wherein the mapping is configurable as a function of image overlap ratio.

3. A method as recited in claim 1, wherein the mapping is configurable as a function of a user specified image overlap ratio.

4. A method as recited in claim 1, further comprising:
   receiving an indication that a user has selected a particular thumbnail image of the thumbnail images to view with respect to local detail and global context; and
   responsive to receiving the indication:
      identifying an original image of the images corresponding to the particular thumbnail image; and
      mapping the original image and remaining ones of the image thumbnails to the 2-D space using a distorted polar coordinate system in view of a configurable distortion rate.

5. A tangible computer-readable data storage medium comprising computer-program instructions for presenting web image search results, wherein the computer-program instructions, are executed by a processor for:
   generating task-based attention objects for each of multiple images associated with image search results returned by a search engine;
   creating thumbnail images from respective ones of the images as a function of at least the task-based attention objects to emphasize image region(s) of greater priority to a user in view of a keyword or an expanded keyword associated with the search results;
   calculating similarity measurements between the images as a function of one or more of content of the task-based attention objects and features associated with the images as a whole, the features comprising one or more of features extracted from the images and context associated with the images; and
   mapping the thumbnail images to a 2-D layout space for presentation to the user as a function of the similarity measurements,
   wherein the similarity is measured by: $VM_{ij}=\alpha RM_{ij}+(1-\alpha)IM_{ij}$, wherein IM is an image similarity matrix between an ith image ($I_i$) and a jth image ($I_j$), RM is a region similarity matrix between an attention region of $I_i$ and $I_j$, and $\alpha$ is a weight to factor in overall similarity and attention region similarity, wherein the overall similarity represents content of a mined image.

6. The tangible computer-readable data storage medium of claim 5, further comprising computer-program instructions executable by the processor for presenting the thumbnail images to the user for browsing.

7. The tangible computer-readable data storage medium of claim 5, wherein results of the computer-program instructions for mapping are configurable as a function of image overlap ratio.

8. The tangible computer-readable data storage medium of claim 5, wherein results of the computer-program instructions for mapping are configurable as a function of a user specified image overlap ratio.

9. The tangible computer-readable data storage medium of claim 5, further comprising computer-program instructions executable by the processor for:
   receiving an indication that a user has selected a particular thumbnail image of the thumbnail images to view with respect to local detail and global context; and
   responsive to receiving the indication:
      identifying an original image of the images corresponding to the particular thumbnail image; and
      mapping the original image and remaining ones of the image thumbnails to the 2-D space using a distorted polar coordinate system in view of a configurable distortion rate.

10. A computing device for presenting web image search results, the computing device comprising:
   a processor; and
   a memory coupled to the processor, the memory comprising computer-program instructions executable by the processor for:

generating task-based attention objects for each of multiple images associated with image search results returned by a search engine;

creating thumbnail images from respective ones of the images as a function of at least the task-based attention objects to emphasize image region(s) of greater priority to a user in view of a keyword or expanded keyword associated with the search results;

mapping the thumbnail images to a 2-D layout space for presentation to the user, wherein the mapping comprises positioning thumbnail images with similar task-based attention objects in close proximity to one another and positioning thumbnail images with a higher search engine rank in front of thumbnail images with a lower search engine rank;

calculating similarity measurements between the images as a function of one or more of content of the task-based attention objects and features associated with the images as a whole, the features comprising one or more of features extracted from the images and context associated with the images; and mapping the thumbnail images to a 2-D layout space for presentation to the user as a function of the similarity measurements, wherein the is similarity measured by: $VM_{ij} = \alpha RM_{ij} + (1-\alpha)IM_{ij}$, wherein IM is an image similarity matrix between an ith image ($I_i$) and a jth image ($I_j$), RM is a region similarity matrix between an attention region of $I_i$ and $I_j$, and $\alpha$ is a weight to factor in overall similarity and attention region similarity, wherein the overall similarity represents content of a mined image.

11. A computing device as recited in claim 10, wherein results of the computer-program instructions for mapping are configurable as a function of image overlap ratio.

12. A computing device as recited in claim 10, wherein results of the computer-program instructions for mapping are configurable as a function of a user specified image overlap ratio.

13. A computing device as recited in claim 10, further comprising computer-program instructions executable by the processor for:

receiving an indication that a user has selected a particular thumbnail image of the thumbnail images to view with respect to local detail and global context; and responsive to receiving the indication:

identifying an original image of the images corresponding to the particular thumbnail image; and mapping the original image and remaining ones of the image thumbnails to the 2-D space using a distorted polar coordinate system in view of a configurable distortion rate.

14. A computer implemented method executed by a processor for presenting web image search results, the method comprising:

generating task-based attention objects for each of multiple images associated with image search results from a search engine;

creating thumbnail images from respective ones of the images as a function of at least the task-based attention objects to emphasize image region(s) of greater priority to a user in view of a keyword or an expanded keyword associated with the search results;

calculating similarity measurements between the images as a function of one or more of content of the task-based attention objects and features associated with the images as a whole, the features comprising one or more of features extracted from the images and context associated with the images; and mapping the thumbnail images to a 2-D layout space for presentation to the user as a function of the similarity measurements, wherein each of the thumbnail images are fit into a grid while substantially maximizing original similarity relationships, and wherein the similarity is measured by: $VM_{ij} = \alpha RM_{ij} + (1-\alpha)IM_{ij}$, wherein IM is an image similarity matrix between an ith image ($I_i$) and a jth image ($I_j$), RM is a region similarity matrix between an attention region of $I_i$ and $I_j$, and $\alpha$ is a weight to factor in overall similarity and attention region similarity, wherein the overall similarity represents content of a mined image.

* * * * *